United States Patent [19]

Kiritani et al.

[11] 3,981,821

[45] Sept. 21, 1976

[54] PROCESS FOR PREPARING MICROCAPSULES

[75] Inventors: Masataka Kiritani; Yasuhiro Ogata, both of Fujimiya, Japan

[73] Assignee: Fuji Photo Film Co., Ltd., Minami-ashigara, Japan

[22] Filed: July 17, 1974

[21] Appl. No.: 489,283

[30] Foreign Application Priority Data

July 17, 1973 Japan .............................. 48-81624

[52] U.S. Cl. ................................ 252/316; 252/522; 428/307
[51] Int. Cl.² ......................................... B01J 13/02
[58] Field of Search ............. 252/316, 522; 428/307

[56] References Cited
UNITED STATES PATENTS 3,432,327    3/1969    Kan et al. ........................ 252/316 X Primary Examiner—Richard D. Lovering
Attorney, Agent, or Firm—Sughrue, Rothwell, Mion, Zinn and Macpeak

[57] ABSTRACT

Microcapsules containing a hydrophobic liquid are prepared by emulsifying the hydrophobic liquid in a hydrophilic liquid immiscible therewith, polymerizing at least one capsule wall-forming substance present in the continuous phase, and depositing the resulting polymer around the droplets of the hydrophobic liquid thereby to envelop the hydrophobic liquid droplets from outside, wherein prior to the step of emulsifying the hydrophobic liquid, a deposition promotor is caused to be present in the droplets of the hydrophobic liquid so as to promote the deposition of the polymer.

4 Claims, 6 Drawing Figures

PROCESS FOR PREPARING MICROCAPSULES

BACKGROUND OF THE INVENTION

1. Field of the Invention

This invention relates to a process for preparing microcapsules containing a hydrophobic liquid.

2. Description of the Prior Art

Microcapsules have already found application in the production of pressure-sensitive copying papers, and a great expectation of the development of their utility in pharmaceuticals, agricultural chemicals, perfumes, and adhesives is expected. Many methods are known for preparing microcapsules, and of these, the following methods appear to be comparatively relevant to the present invention.

a. A method which comprises dissolving a water-soluble aminoaldehyde condensate in a continuous phase, polymerizing the aminoaldehyde condensate using an acid catalyst, depositing the polymer around the particles to be occluded therein which are dispersed in the continuous phase, thereby to encapsulate the particles (as disclosed in U.S. Pat. No. 3,516,941).

b. A method which comprises incorporating substances which react with each other to form a polymer which is insoluble both in a hydrophilic liquid and in a hydrophobic liquid (not including substances which self-polymerize) in each of these liquids, emulsifying one of the liquids in the other, and encapsulating the liquids by the polymerization at the interface of the hydrophilic liquid with the hydrophobic liquid (an interfacial polymerization method; as disclosed in British Pat. Nos. 1,091,076 and 1,091,077).

c. A method which comprises dissolving a substance containing a double bond in a hydrophobic liquid, emulsifying the solution in water, and polymerizing the substance containing a double bond in the droplets of the hydrophobic liquid to encapsulate the liquid (an internal polymerization method; as disclosed in U.S. Pat. No. 2,969,330).

In method (a) mentioned above, the polymer formed by polymerization in the continuous phase does not deposit only around the particles to be occluded, but particles consisting only of the polymer are formed in the continuous phase. It is difficult therefore to deposit all of the wall-forming substance used around the particles to be occluded with good efficiency. As a result, microcapsules obtained by method (a) have a very thin capsule wall, and in some cases, the particles to be occluded per se without any capsule walls (that is, unencapsulated oil droplets) remain. Accordingly, method (a) does not provide capsules having a high ability to retain the contents. Furthermore, the capsules obtained by method (a) have the defect of low mechanical strength.

According to method (b), once a thin capsule wall has been formed in the interface, the reaction between the reactant in the continuous phase and the reactant in the liquid droplets to be occluded stops. Accordingly, method (b) has the defect that the capsule wall obtained is thin, and unreacted reactants remain in the system. Furthermore, according to method (b), large quantities of reactants must be dissolved in the liquids to be occluded, and therefore, those liquids that can be occluded are limited to those which have a high solubilizing power for the reactants, and which are inert to the reactants. Also, because of the thin capsule walls obtained, a defect exists in that the ability to retain the contents in the capsules is poor, and the mechanical strength is low.

SUMMARY OF THE INVENTION

Accordingly, it is an object of this invention to provide a process for preparing microcapsules having a very high ability to retain a material occluded therein, and a high stability to external forces such as pressure or friction.

It has now been found that the above object of this invention can be achieved by a process for encapsulation which comprises emulsifying a hydrophobic liquid to be encapsulated as a disperse phase in a hydrophilic liquid immiscible therewith as a continuous phase, polymerizing at least one capsule wall-forming substance present in the hydrophilic liquid continuous phase, and depositing the resulting polymer around the droplets of the hydrophobic liquid thereby to envelope the hydrophobic liquid droplets from the outside; in which a substance which has reactivity with at least one of the wall-forming substances in the continuous phase and consequently promotes the deposition of the polymer resulting in the continuous phase is caused to be present in the droplets of the hydrophobic liquid prior to the step of emulsifying the hydrophobic liquid.

BRIEF DESCRIPTION OF THE ACCOMPANYING DRAWINGS

FIGS. 1 to 6 are spectral curves showing the color densities and the color contamination density obtained for microcapsules prepared in the examples both in accordance with the invention and in accordance with prior art techniques.

DETAILED DESCRIPTION OF THE INVENTION

Figure 1:
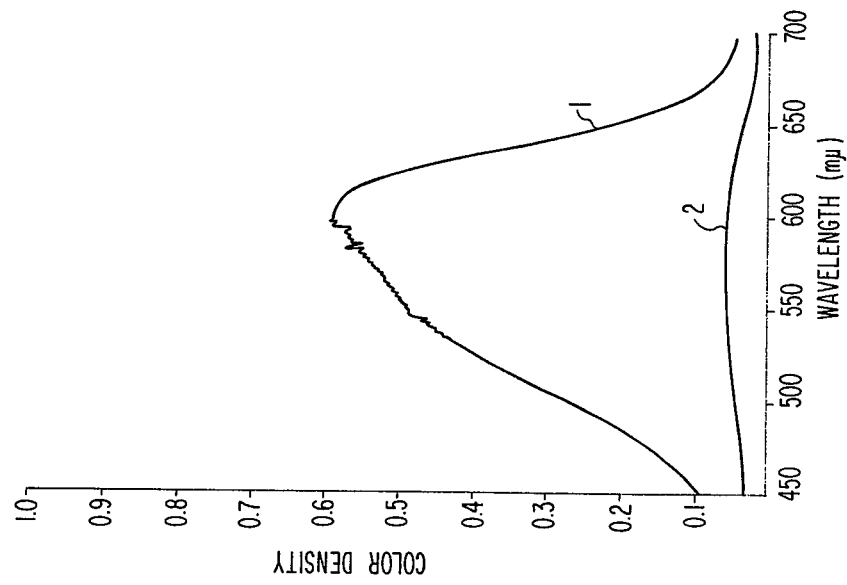

The term "consequently" used above means not only the case wherein the above deposition promoting agent acts on the resulting polymer to promote the deposition of the polymer, but also the case wherein the deposition promoting agent acts first on the reactants to draw them near the droplets of the hydrophobic liquid and then allows the reactants to polymerize. The feature of adding a reactive substance to liquid droplets to be occluded and reacting the reactive substance with a reactant in the continuous phase superficially resembles method (b) cited above, but in actuality, the two methods are essentially different. According to method (b), it is essential to form capsule walls by the reaction of a wall-forming substance in the hydrophilic liquid with a wall-forming substance in the hydrophobic liquid at the interface between these liquids. On the other hand, in the present invention, it is not essential for the substance contained in the hydrophobic liquid droplets to react with the reactant in the continuous phase to form capsule walls. In the present invention, a part of the reactant in the continuous phase is trapped inside the droplets of the hydrophobic liquid, and the polymer formed in the continuous phase is deposited preferentially around the hydrophobic liquid droplets. Accordingly, the amount of the deposition promoting agent to be added to the hydrophobic liquid in the present invention is far smaller than that used in the interfacial polymerization method. In addition, since it is not essential for this agent itself to form capsule walls, this agent is not limited to substances having at least two functional groups as is required in the interfacial polymerization method. In method (b), the liquid to be occluded should be those which can dissolve large quantities of reactants having at least two functional groups and must be inert to the reactants. In contrast, in the process of this invention, when one wall-forming substance is used in the continuous phase, it is self-polyermized to form polymer walls, and when two or more wall-forming substances are used, they are copolymerized at least with each other to form polymer walls.

The amount of the deposition promoting agent is, for example, about 0.05 to 10 parts, preferably 0.2 to 5 parts per 30 parts by weight of the oily liquid. Amounts greater than 10 parts can also be used, if desired. The weight ratio between the amount of the deposition promoting agent and the amount of the capsule wall-forming substance is 0.16 to 0.4.

Thus, the liquid to be occluded is not limited by the solubility of the substance to be contained in the liquid (deposition promoting agent), and liquids having activity toward the deposition promoting agent can also be encapsulated. Furthermore, according to this invention, substances having one functional group can also be used as the liquid to be occluded, and therefore, the liquid to be encapsulated can be selected from a wide range of materials and the liquid is not limited depending on the deposition promoting agent employed. Furthermore, the microcapsules prepared by the process of this invention have high stability to friction or pressure and a high ability to retain the contents, and in addition the contents are not released upon heating.

The wall-forming substance to be present in the continuous phase in the present invention can be any water-soluble reactants which self-polymerize to form water-insoluble polymers, or those which react with another reactant in the continuous phase to form water-insoluble polymers.

The deposition promoting agent to be added to the hydrophobic liquid so as to trap the reactant in the continuous phase onto the surface of the hydrophobic liquid droplets can be any compound which is soluble in the hydrophobic liquid and reacts with at least one reactant in the continuous phase to form a bond.

Typical examples of the reactants which can be used in the continuous phase are a combination of an amino-containing compound and an epoxy compound, a combination of an amino compound and an aldehyde compound, a combination of a urea resin and an aldehyde compound, a combination of a urea resin and an amino compound, a combination of a melamine resin and an amino compound, and a combination of a melamine compound and an aldehyde compound, and also compounds which self-polymerize, such as a urea resin or a melamine resin.

Typical examples of deposition promoting agents which can be used in the hydrophobic liquid to be occluded are compounds containing isocyanate groups, compounds containing amino groups, compounds containing acid chloride groups, compounds containing epoxy groups, compounds containing chloroformate groups, and compounds containing aldehyde groups, which are all soluble in the hydrophobic liquid.

Typical combinations of the deposition promoter and the reactant to be polymerized in the continuous phase which can be used are shown in Table 1 below. The deposition promoting agent can be the same compound as or a different compound from the reactant.

TABLE 1

| Deposition Promotor in the Hydrophobic Liquid | Reactants to be Polymerized in the Continuous Phase |
|---|---|
| Isocyanate Compound | Amino Compound - Epoxy Compound |
| Amino Compound | Amino Compound - Aldehyde Compound |
| Acid Chloride Compound | Urea Resin - Aldehyde Compound |
| Epoxy Compound | Urea Resin - Amino Compound |
| Chloroformate Compound | Melamine Resin - Aldehyde Compound |
| Aldehyde Compound | Melamine Resin Urea Resin |

Any combination of the above can be chosen, as desired.

Examples of isocyanates which can be added to the hydrophobic liquid in this invention include isocyanate monomers such as hexamethylene isocyanate; diisocyanate monomers such as hexamethylene diisocyanate, xylylene diisocyanate, tolylene diisocyanate, or diphenylmethane diisocyanate; triisocyanate monomers such as triphenyl methane triisocyanate or tolylene triisocyanate; tetraisocyanate monomers such as 4,4'-dimethyl diphenylmethane-2,2',5,5'-tetraisocyanate; and adducts formed between isocyanates having at least two functional groups and polyhydroxy compounds, polycarboxylic acids, polyvalent thiols, polyamines, or epoxy compounds, etc., which contain at least one free isocyanate group per molecule (for example, at least two, preferably, at least three, isocyanate groups). Polyisocyanate polymers (for example, dimers or trimers, etc.) such as tolylene diisocyanate polymers (for example, trimers) or diphenylmethane diisocyanate polymers (for example, trimers).

The amino compounds which can be added to the hydrophobic liquid include, for example, amines soluble in the hydrophobic liquid, such as aniline, phenylenediamine, 4,4'-diaminobiphenyl or 4,4',4''-triaminotriphenylmethane, and polyamine-epoxy compound adducts containing an amino group which are soluble in the hydrophobic liquid.

Examples of suitable acid chlorides are aromatic acid chlorides such as benzyl chloride, terephthaloyl chloride, trimellitic acid chloride or sebacoyl chloride, and aliphatic acid chlorides.

Examples of epoxy compounds which can be added to the hydrophobic liquid are epichlorohydrin, a reaction product formed between bisphenol A and epichlorohydrin (for example, the reaction product of 1 mol of bisphenol A and 1 to 2 mols of epichlorohydrin), polyethylene glycol glycidyl ether, polypropylene glycol glycidyl ether, a phenol-type epoxide obtained by reacting a precondensate of a phenol resin with epichlorohydrin, a reaction product formed between a hydroxy compound such as ethylene glycol, propylene glycol, glycerine, hydroquinone, resorcinol or catechol and epichlorohydrin, and aromatic or aliphatic carboxylic acid glycidyl esters.

The chloroformate compound can, for example, be an aliphatic or aromatic chloroformate such as hexamethylene bis-chloroformate or phenylene bis-chloroformate.

Examples of suitable aldehydes which can be used in the hydrophobic liquid are aromatic aldehydes such as benzaldehyde, isophthalaldehyde, cinnamyl aldehyde, phthalaldehyde or tolualdehyde, and aliphatic aldehydes such as caprondialdehyde, caprylaldehyde, nonylaldehyde or tetradecyldialdehyde, which are soluble in the hydrophobic liquid.

The amino compound used in the hydrophilic liquid for forming a continuous phase can, for example, be those amino compounds which are soluble or dispersible in water. Specific examples of amino compounds include aliphatic amines such as hexamethylene diamine, octyl diamine, diaminononane or hexamethylene triamine, heterocyclic diamines such as 3,9-bis-aminopropyl-2,4,8,10-tetraoxaspiro-[5,5]undecane, and polyethylene imine. Addition products of these amines with epoxy compounds or acrylonitrile which contain a free amino group can also be used. In particular, the addition products formed between heterocyclic diamines and acrylonitrile or butyl glycidyl ether are useful. Specific examples of these addition products include 3,9-bis-aminopropyl-2,4,8,10-tetraoxaspiro-[5,5]undecane-acrylonitrile adduct and 3,9-bis-aminopropyl-2,4,8,10-tetraoxaspiro-[5,5]undecane butyl glycidyl ether adduct.

The aldehyde compound used in the continuous phase can, for example, be formaldehyde, glutaldehyde, glyoxal, propionaldehyde or aldehyde starch.

Examples of the epoxy compound used in the continuous phase are those epoxy compounds obtained by reacting water-soluble polyols with epichlorohydrin and which are soluble or dispersible in water. Specific examples of these epoxy compounds include polyethylene glycol diglycidyl ether, glycerine diglycidyl ether, trimethylolpropane triglycidyl ether, and propylene glycol diglycidyl ether.

The urea resin used in the continuous phase is a reaction product of urea with an aldehyde, and specific examples of these resins are a urea/formaldehyde reaction product, a urea/glyoxal reaction product, and a urea/glutaldehyde reaction product. Since the urea resin self-polymerizes on heating or pH adjustment to form a polymer insoluble in water, a urea resin can be used even alone in the continuous phase. Furthermore, a urea resin can be used in combination with an aldehyde compound or an amino compound since a urea resin reacts with such a compound to form a water-insoluble polymer.

The melamine resin used in the continuous phase is a reaction product formed between melamine and an aldehyde, and specific examples of these resins include a melamine/formaldehyde reaction product, a melamine/glyoxal reaction product, and a melamine-glutaldehyde reaction product. Since a melamine resin self-polymerizes upon heating or pH adjustment to form a water-insoluble polymer, a melamine resin can be used in the continuous phase even alone. A melamine resin also reacts with an aldehyde compound or an amino compound, and can be used in combination with such a compound.

The reactants used in the continuous phase can be added to the continuous phase prior to the emulsification of the hydrophobic liquid in the continuous phase, or after the emulsification. The deposition promoter used in the hydrophobic liquid should be dissolved in the hydrophobic liquid prior to emulsification. A suitable amount of the reactants in the hydrophilic liquid can range from about 0.1 to 20, preferably 0.2 to 10, parts by weight per 30 parts by weight of the hydrophilic liquid. To prepare the microcapsules, an oily liquid including a deposition promoter is added into the continuous phase optionally containing a reactant and emulsified. Alternatively after emulsification a reactant can be added to the continuous phase.

The temperature at which microencapsulation is performed is not limited in particular. Generally, a preferred range is from about room temperature (e.g., about 20° to 30°C) to about 95°C. Use of temperatures below room temperature can be employed but may result in longer reaction times being required. When the deposition promoter used in the hydrophobic liquid is a highly reactive compound such as an isocyanate compound, an acid chloride compound or a chloroformate compound, i.e., when the reactants react vigorously, it is desirable to maintain the temperature of the system at a point below room temperature (about 20° to 30°C) at the time of emulsification. If the reactants to be added to the continuous phase are highly reactive, the reactants in the continuous phase rapidly react with each other to give a flocculated mass of several droplets of the hydrophobic liquid, and in the extreme case, the entire system is gelled. In such a case, rapid polymerization can be prevented by adding the reactants at a temperature below room temperature or adding them gradually, whereby mononuclear casules each of which contains one droplet of the hydrophobic liquid are obtained.

When the reactants have low polymerizability and the reaction does not proceed to a sufficient extent, the polymerization reaction can be promoted by heating the system.

The hydrophobic liquid to be encapsulated is an organic solvent which is immiscible with water. Specific examples include synthetic oils such as alkylnaphthalenes, alkylated diphenyls, alkylated diphenylalkanes, hexahydroterphenyl, triaryldimethanes, chlorinated paraffins, diethyl phthalate, dibutyl phthalate, dioctyl phthalate, dibutyl maleate, toluene, dichlorobenzene or benzyl alcohol, and natural oils such as cotton seed oil, soybean oil, corn oil, castor oil, fish oil or lard.

Furthermore, it is possible to use the deposition promoter itself as the hydrophobic liquid and encapsulate the deposition promotor as the hydrophobic liquid.

In order to emulsify and disperse the hydrophobic liquid in an aqueous liquid, a protective colloid or a surface active agent can be used. Examples of protective colloids are natural or synthetic water-soluble polymeric substances such as gelatin, gum arabic, casein, carboxymethyl cellulose, starch or polyvinyl alcohol. A suitable amount of the protective colloid can range from about 0.5 to 30% by weight, preferably 2 to 20% by weight.

Examples of surface active agents are anionic surfactants such as alkylbenzenesulfonic acid salts, alkyl naphthalenesulfonic acid salts, polyoxyethylene sulfuric acid salts or Turkey red oil; nonionic surfactants such as polyoxyethylene alkyl ethers, polyoxyethylenes, or sorbitan fatty acid esters; cationic surfactants such as alkylamine salts, quaternary ammonium salts or polyoxyethylene alkyl amines; and amphoteric surfactants such as alkylbetaines. A suitable amount of the surface active agent can range from about 0.02 to 1% by weight, preferably 0.05 to 0.5% by weight in the continuous phase.

The microcapsules produced by the process of this invention have a very high ability to retain the contents of the capsules and a very high mechanical strength. Accordingly, these advantages are especially significant when the microcapsules obtained by the process of this invention are utilized in pressure-sensitive copying papers. An upper sheet of a pressure-sensitive copying paper obtained by coating a base sheet with a microcapsule solution obtained by encapsulating a hydrophobic liquid having dissolved therein a color former for a pressure-sensitive copying paper in accordance with the encapsulating method of this invention does not release its contents upon storage for prolonged periods of time or upon heating, and therefore, its color-forming ability is not reduced during storage for prolonged periods of time or at high temperatures. Furthermore, the microcapsules obtained by the process of this invention are very resistant to pressure or forces such as friction. Thus, when such an upper sheet is handled together with a lower sheet for a pressure-sensitive copying paper, the lower sheet is not contaminated by the color caused by slight pressure or friction, and it is possible to produce products having an extremely high commercial value.

When a perfume oil is included in the microcapsules produced by the process of this invention, the perfume ingredient can be maintained for very long periods of time.

The following Examples illustrate the present invention in greater detail. Unless otherwise indicated, all parts, percents, ratios and the like are by weight.

EXAMPLE 1

One gram of crystal violet lactone (a color former for pressure-sensitive copying paper and used as an indicator for determining the ability of the capsules to retain the contents) was dissolved in 30 g of isopropyl naphthalene (a hydrophobic liquid to be occluded). In the resulting solution was dissolved 0.5 g of tolylene diisocyanate trimer as a deposition promotor. The hydrophobic liquid obtained was added with vigorous stirring to 50 g of water at 15°C containing 2 g of carboxymethyl cellulose and 2 g of polyvinyl alcohol dissolved therein thereby to form droplets of the hydrophobic liquid each having a diameter of about 5 to 10 microns, and then 100 g of water was added. To the resulting system were added as reactants to be added to the continuous phase, 3 g of Epomate N-001 (an adduct of 1 mol of 3,9-bis-aminopropyl-2,4,8,10-tetraoxaspiro-[5,5]undecane and 1 mol of acrylonitrile—a polyamine, active hydrogen equivalent 110, amine value 340) and 3 g of an aqueous solution of formaldehyde (47% by weight) gradually. At this time, the Epomate N-001 polymerized with the formaldehyde in the aqueous phase to form a water-insoluble polymer. The polymer deposited around the hydrophobic liquid droplets preferentially due to the action of the deposit promoting agent present in the hydrophobic liquid, and formed the capsule walls. The above steps were all conducted at 15°C. After stirring this system continuously for 4 hours at this temperature, the system was heated to 40°C to complete the reaction, and the encapsulation was completed. Microcapsules containing the solution of crystal violet lactone in isopropyl naphthalene, enveloped with a capsule wall of a polymer formed between the polyamine and formaldehyde, were obtained. The microcapsules so obtained had a very superior ability to retain the contents, and were stable to pressure or friction. In order to compare these microcapsules with microcapsules produced using methods (a) and (b) described hereinabove, microcapsules were prepared by the following two methods, and compared with the microcapsules obtained by the process of this invention.

1. Encapsulation by Method (a):

Encapsulation was performed only by a polymerization of reactants in the continuous phase without using a deposition promoter in the hydrophobic liquid to be occluded. In other words, Example 1 was repeated except that the deposition promoter was not used.

2. Encapsulation by Method (b):

Encapsulation was performed only by the interfacial polymerization of the reactant in the hydrophobic liquid to be occluded with the reactant in the continuous phase. That is to say, Example 1 was repeated except that the formaldehyde was not added to the continuous phase. In this case, the tolylene diisocyanate polymer in the hydrophobic liquid droplets and the Epomate N-001 (polyamine) in the continuous phase were reactants for forming the capsule walls by interfacial polymerization. Actually, however, capsules were not formed in this case.

Each of these three capsule solutions (the capsule solution obtained by the process of this invention, the capsule solution obtained by method (a), and the capsule solution obtained by method (b)) was coated on a sheet of paper using a coating bar, and dried at 100° to 150°C to form a sheet coated with capsules. Since these capsules contained crystal violet lactone as a color former for a pressure-sensitive copying paper, the resulting sheet could be used as an upper sheet of a pressure-sensitive paper. The upper sheet immediately after coating was superimposed on a lower sheet of a pressure-sensitive copying paper. The lower sheet had been obtained by adding 8 cc of a 20% by weight aqueous solution of sodium hydroxide as a dispersing agent and 100 g of acid clay to 300 g of water, stirring the mixture vigorously to form a dispersion, then adding 40 g of a styrene/butadiene latex as a binder to form a color developer solution, coating the color developer solution on a sheet of paper using a coating bar, and drying it. A pressure of 600 kg/cm$^2$ was applied to the superimposed assembly to rupture all the microcapsules, whereupon blue marks were obtained on the lower sheet of the pressure-sensitive copying paper.

Figure 2:
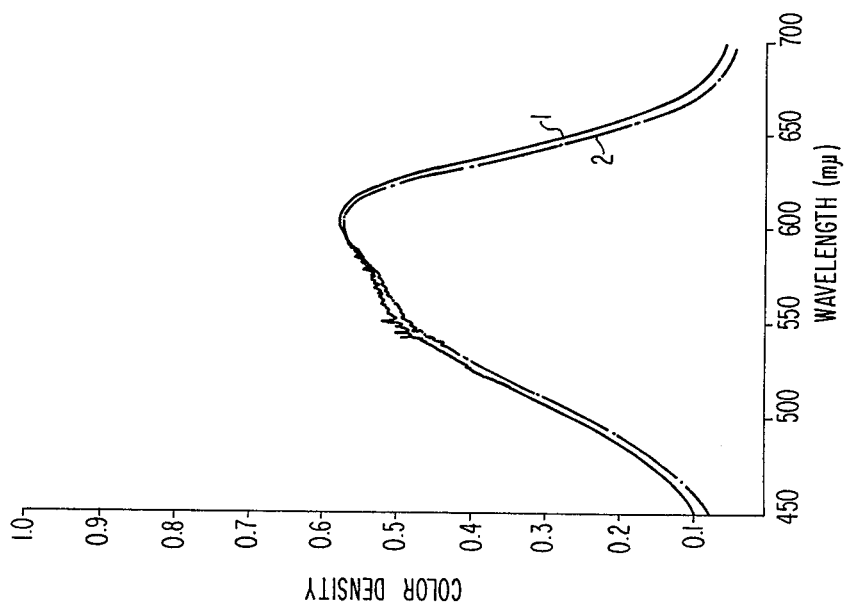
Figure 3:
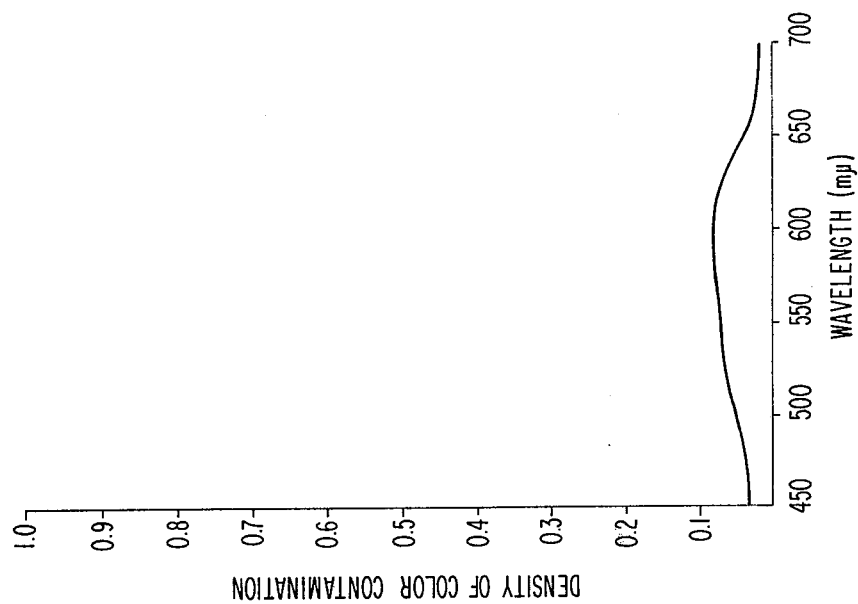
Figure 4:
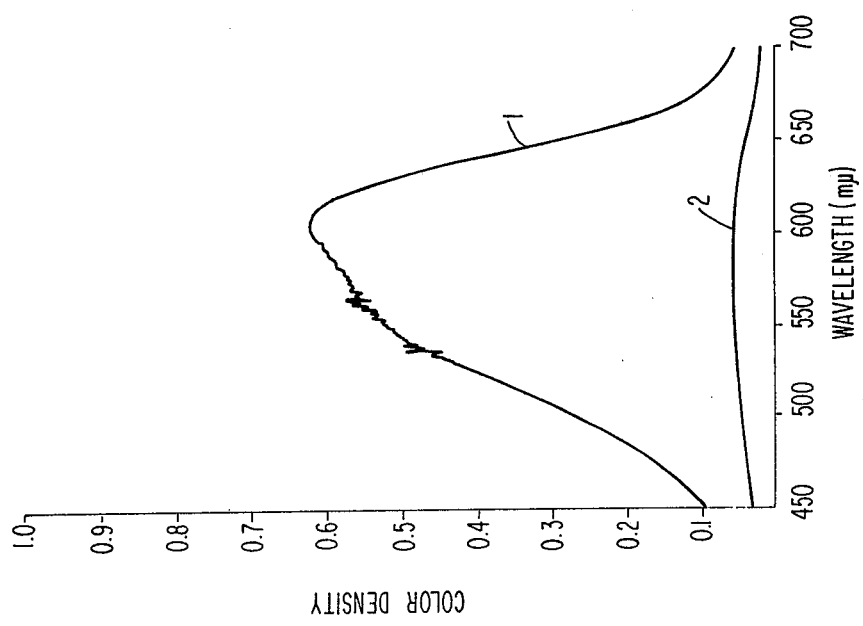
Figure 6:
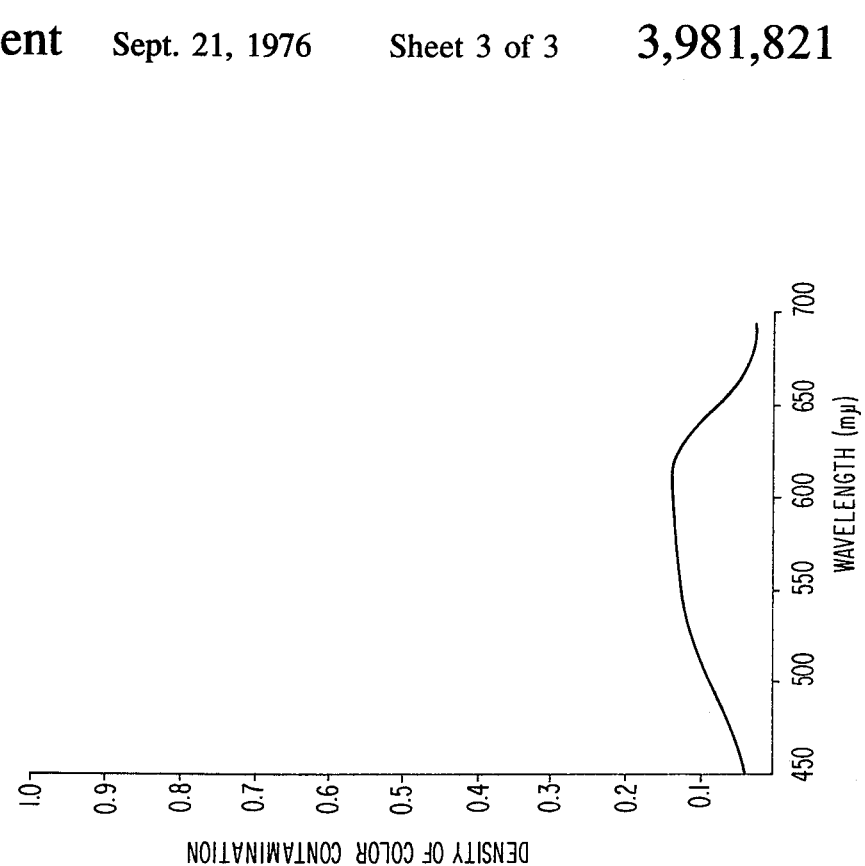
Figure 5:
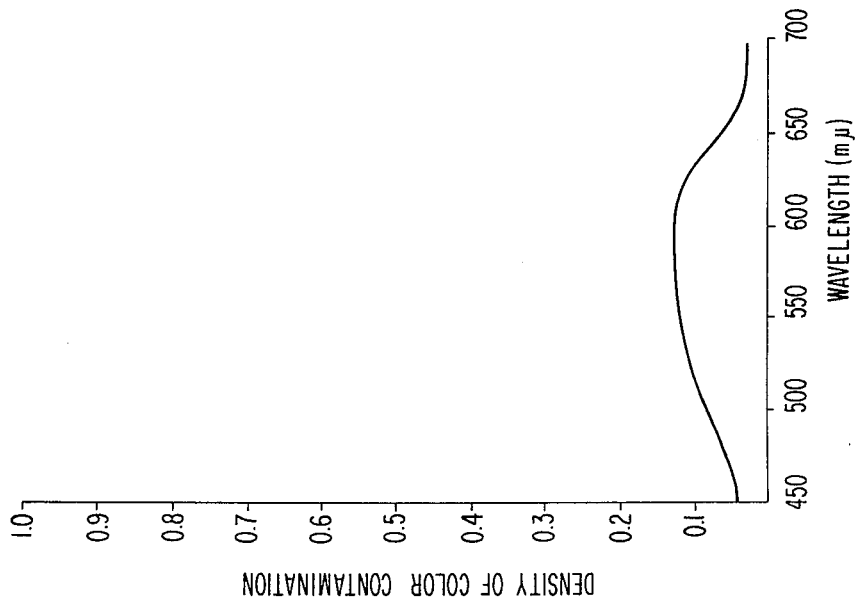

When the upper sheet coated with each of the capsule solutions was first heated at 80°C for 24 hours and then pressure was applied to an assembly of the upper sheet and lower sheet, no reduction in color forming ability was observed with the upper sheet coated with the capsule solution obtained by the encapsulation method of this invention. However, since the upper sheets coated with the capsule solutions obtained using method (a) and method (b) had already released their occluded liquid due to the action of heat, no color was formed at all. It can thus be seen that with methods (a) and (b), capsules were essentially not formed, but only an emulsion of the hydrophobic liquid resulted. The colors formed on such upper sheets were measured using a spectrophotometer. The results obtained are shown in FIGS. 1 to 3 which respectively illustrate spectral curves showing the color forming densities of capsules obtained respectively by the method of this invention, method (a) and method (b). In these figures, 1 shows the measurements immediately after coating, and 2 shows those after heating at 80°C for 24 hours. FIGS. 4 to 6 show the spectral curves of the density of color contamination due to the capsules obtained by the method of this invention, method (a), and method (b), respectively.

The microcapsules obtained by the encapsulation method of this invention have an excellent ability to retain the occluded hydrophobic liquid as compared with methods (a) and (b).

Furthermore, the upper sheet immediately after coating was superimposed on the lower sheet, and the capsules were ruptured with a relatively weak pressure of 40 kg/cm$^2$. Then, the density of color contamination on the lower sheet was measured for comparison. It was found that when the upper paper coated with the capsules obtained by the process of this invention was used, the density of color contamination was far lower than in the case of using the capsule solutions obtained with methods (a) and (b). This showed that the microcapsules obtained by the process of this invention are very resistant to slight pressures. Accordingly, when utilized in a pressure-sensitive copying paper, the microcapsules in accordance with the process of this invention have the advantage of giving products of a high commercial value because color is not formed due to weak pressures encountered during handling. According to methods (a) and (b), capsule walls were not at all formed, and the emulsion of the hydrophobic liquid was exposed. Consequently, even by mere contact with the lower sheet, color was formed on the lower sheet.

As described above, the microcapsules obtained by the method of this invention were far superior to those obtained with methods (a) and (b) in respect to the ability to retain the occluded liquid and mechanical strength.

EXAMPLE 2

One gram of a deposition promoter (an adduct of 1 mol of trimethylol propane and 3 mols of hexamethylene diisocyanate) was dissolved in 20 g of Print Aroma Orange (perfume oil) as a hydrophobic liquid to be occluded. The resulting solution was emulsified in water containing 3 g of a polyethylene imine polymer (having a degree of polymerization of about 1,000) as a reactant in the continuous phase and 0.5 g of Turkey red oil as an emulsifying agent to form droplets of the hydrophobic liquid having a diameter of not more than about 50 microns. 60 g of water was added to dilute the system, and then in order to polymerize the polyethylene imine polymer, 5 g of a 30% aqueous solution of glyoxal was gradually added with continued stirring. All of the above procedure was conducted at room temperature.

At this time, the polymer of polyethylene imine and glyoxal formed deposited selectively on the surface of the hydrophobic liquid droplets due to the action of the deposition promotor in the hydrophobic liquid droplets to form capsule walls. The encapsulation was completed after continuing the stirring for 5 hours, to form a microcapsule solution. For comparison, capsules were prepared using methods (a) and (b).

1. Encapsulation by Method (a):

Encapsulation was performed only by polymerization of the reactants in the continuous phase. That is to say, the procedure of Example 2 was repeated except that the deposition promotor was not used.

2. Encapsulation by Method (b):

Encapsulation was performed by the interfacial polymerization of polyethylene imine in the continuous phase with an adduct of 3 mols of hexamethylene diisocyanate and 1 mol of trimethylol propane. That is to say, the procedure of Example 2 was repeated except that the glyoxal was not used.

Each of the three capsule solutions obtained was coated on a sheet of paper using a coating bar, and dried to form a sheet having coated thereon a microcapsule solution containing the perfume oil.

When the capsules of this invention were used, the smell of the perfume oil was scarcely discerned, and only when the capsules were ruptured by rubbing the surface of the sheet, was a strong orange odor discerned. Even after storage for 30 days, the perfume retaining ability was not lost. On the other hand, with the capsule solutions obtained by methods (a) and (b), sufficient capsule walls were not formed. Therefore, the perfume oil component was released even when the surface of the sheet was rubbed immediately after coating even though the capsules did not become ruptured, and a strong orange odor was diffused. Furthermore, when these sheets were stored for 30 days and then their surfaces were rubbed, no orange odor was discerned.

In method (b), the amount of the reactant was increased to form thick capsule walls in order to improve the odor retaining ability. That is to say, encapsulation was performed by interfacial polymerization using 20 g of an adduct of 3 mols of hexamethylene diisocyanate and 1 mol of tolylene diisocyanate (the amount of 20 g is a sufficient amount for encapsulation by interfacial polymerization if the hydrophobic liquid is an ordinary inert hydrophobic liquid). The resulting capsule solution was coated on a sheet. Even when the capsules were ruptured immediately after coating, no odor of the perfume oil was observed. This is because the reactant for forming the capsule wall reacts with the perfume component in the oil. Thus, according to interfacial polymerization method (b), even if an attempt is made to increase the amount of the reactant and to enhance the ability to retain the occluded liquid, components active with the reactant react with the reactant, making microencapsulation impossible to perform.

EXAMPLE 3

One gram of phthalaldehyde as a deposition promotor was dissolved in 30 g of a hydrophobic liquid (diethyl diphenyl ethane). The solution was emulsified in 50 g of water having dissolved therein 4 g of polyvinyl alcohol to form droplets of the hydrophobic liquid. The system was diluted by adding 80 g of water. To the continuous phase, 10 g of Uramine P-5200 (an epoxy polyurea polyamide co-condensed resin: resin concentration 25%, specific gravity 1.08/20°C, viscosity 0.35 poises at 20°C) was added. With stirring, 3 g of the above Epomate N-001 was added. At this time, the Uramine P-5200 polymerized with the Epomate N-001 in the continuous phase. The polymer deposited around the hydrophilic liquid droplets by the action of the deposition promotor. All of the above procedure was conducted at room temperature. Stirring was continued for 2 hours to complete the encapsulation. As a result, microcapsules containing diethyl diphenyl ethane were obtained.

EXAMPLE 4

3 g of phenylene diamine as a deposition promotor was dissolved in 20 g of a hydrophobic liquid (toluene) to be occluded. The resulting solution was emulsified with vigorous stirring in 50 g of a 30% by weight aqueous solution of a water-soluble melamine-formaldehyde resin. The above procedure was conducted at room temperature. After adding 80 g of water to the continuous phase, the emulsion was heated to 60°C. At this time, the melamine-formaldehyde resin was polymerized in the continuous phase to form a water-insoluble polymer. This polymer deposited around the toluene droplets due to the action of the deposition promotor dissolved in the toluene to form capsule walls. Stirring was continued at 60°C for 4 hours to complete the encapsulation. Microcapsules containing toluene were obtained.

While the invention has been described in detail and with reference to specific embodiments thereof, it will be apparent to one skilled in the art that various changes and modifications can be made therein without departing from the spirit and scope thereof.

What is claimed is:

1. A process for preparing microcapsules which comprises emulsifying a hydrophobic liquid as droplets thereof in a hydrophilic liquid immiscible therewith as a continuous phase, polymerizing at least one capsule wall-forming substance present in the continuous phase and selected from the group consisting of a combination of an amino containing compound and an epoxy compound; a combination of an amino compound and an aldehyde compound; a combination of a urea resin and an aldehyde compound; a combination of a urea resin and an amino compound; a combination of a melamine resin and an amino compound; a combination of a melamine compound and an aldehyde compound; a self-polymerizable urea resin; and a self-polymerizable melamine resin, and depositing the resulting polymer around the droplets of the hydrophobic liquid thereby to envelop the hydrophobic liquid droplets from outside; wherein the hydrophobic liquid prior to emulsification contains a deposition promoting agent which is reactive with said at least one wall-forming substance in the continuous phase and consequently promotes the deposition of the polymer resulting in the continuous phase, said agent being used in an amount sufficient to promote said deposition, said agent being selected from the group consisting of a hydrophobic liquid soluble isocyanate compound, a hydrophobic liquid soluble amino compound, a hydrophobic liquid soluble acid chloride, a hydrophobic liquid soluble epoxy compound, a hydrophobic liquid soluble compound containing chloroformate groups, and a hydrophobic liquid soluble aldehyde compound, the weight ratio between the amount of the deposition promoting agent and the amount of the capsule wall-forming substance is 0.16 to 0.4.

2. The process of claim 1, wherein said hydrophobic liquid contains said agent in an amount of about 0.05 to 10 parts per 30 parts by weight of said hydrophobic liquid.

3. The process of claim 1, wherein said hydrophobic liquid is a natural oil or a synthetic oil.

4. The process of claim 1, wherein said natural oil is cotton seed oil, soybean oil, corn oil, castor oil, fish oil or lard and wherein said synthetic oil is an alkylnaphthalene, an alkylated diphenyl, an alkylated diphenylalkane, a hexahydroterphenyl, a triaryldimethane, a chlorinated paraffin, diethyl phthalate, dibutyl phthalate dioctyl phthalate, dibutyl maleate, toluene, dichlorobenzene or benzyl alcohol.

* * * * *